United States Patent [19]
Lewin et al.

[11] Patent Number: 5,508,127
[45] Date of Patent: Apr. 16, 1996

[54] SOLID OXIDE FUEL CELLS

[75] Inventors: Robert G. Lewin, Bury; Geoffrey A. Wood, Lancashire, both of United Kingdom

[73] Assignee: British Nuclear Fuels plc, Warrington, United Kingdom

[21] Appl. No.: 193,043
[22] PCT Filed: Jun. 7, 1993
[86] PCT No.: PCT/GB93/01199
§ 371 Date: Jun. 8, 1994
§ 102(e) Date: Jun. 8, 1994
[87] PCT Pub. No.: WO93/26055
PCT Pub. Date: Dec. 23, 1993

[30] Foreign Application Priority Data

Jun. 5, 1992 [GB] United Kingdom ............... 9211993

[51] Int. Cl.$^6$ ................................................. H01M 8/02
[52] U.S. Cl. ............................... 429/30; 429/33; 429/34; 429/38; 429/41
[58] Field of Search ........................ 429/30, 33, 34, 429/38, 41

[56] References Cited

U.S. PATENT DOCUMENTS

| 3,377,203 | 4/1968 | Möblus et al. | |
|---|---|---|---|
| 3,436,269 | 4/1969 | Mitoff. | |
| 3,554,808 | 1/1971 | Fischer et al. | |
| 4,812,329 | 3/1989 | Isenberg | 427/115 |
| 4,894,297 | 1/1990 | Singh et al. | 429/31 |
| 5,034,288 | 7/1991 | Bossel. | |
| 5,130,210 | 7/1992 | Iwasaki et al. | 429/33 |

Primary Examiner—Stephen Kalafut
Assistant Examiner—M. Nuzzolillo
Attorney, Agent, or Firm—Nixon & Vanderhye

[57] ABSTRACT

A solid fuel cell for high temperature operation including a refractory solid electrolyte, an anode and a cathode both in intimate contact with the electrolyte and an electronically conducting interconnect medium having pores or channels therethrough permitting oxidant and fuel to be delivered without mixing respectively to the cathode and the anode, wherein the anode, cathode and interconnect medium are provided as zones within a common unitary material, the anode and cathode being present as zones adjacent to different surfaces of the material and the interconnect medium being present as a zone intermediate to the cathode and anode zones.

11 Claims, 1 Drawing Sheet

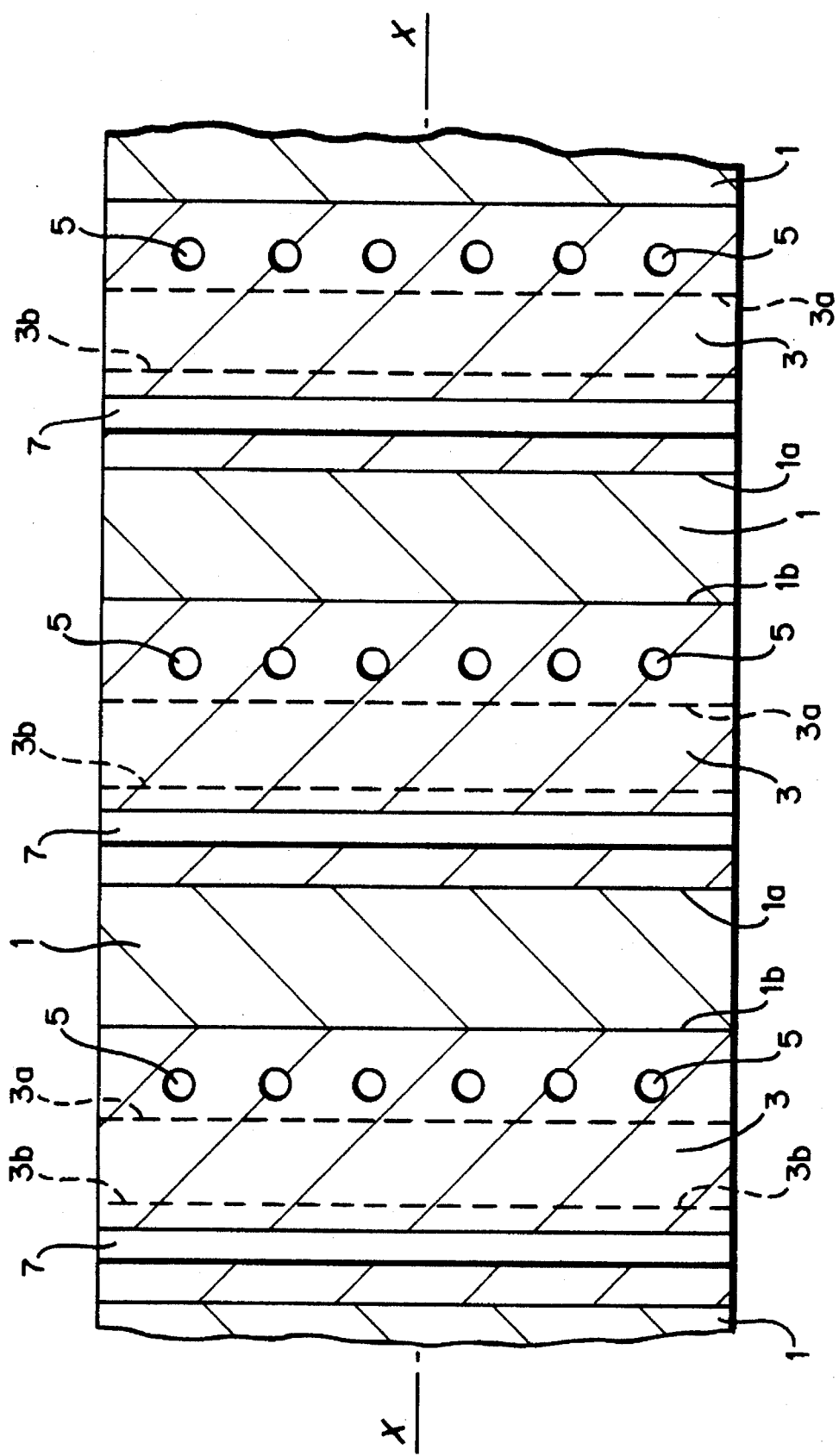

SOLID OXIDE FUEL CELLS

BACKGROUND OF THE INVENTION

1. Field of the Invention

The present invention relates to fuel cells and in particular to solid oxide fuel cells.

2. Discussion of Prior Art

Fuel cells are electrochemical devices that convert chemical energy obtained from the reactants into electrical energy. A number of different families of such devices have been developed in the prior art. These vary according to the type of electrolyte used in the cell and the usual temperature of operation. All of the deices burn fuel at the anode or negative electrode and consume an oxidant at the cathode or positive electrode. The present invention is concerned with so-called solid oxide fuel cells, herein called "SOFC s", in which the electrolyte is a solid refractory oxide, and a temperature of the order of 900 to 1000 C. is employed in operation of the cell. Such cells normally form one building block of a stack of cells of an electrochemical energy source.

In more known SOFCs the electrolyte is contained between an anode and a cathode and the anode and cathode of adjacent cells in a stack are contained between an interconnect or bipolar plate which permits electronic conduction and allows reactant gases to be delivered separately to regions adjacent to the anode and cathode. The reactant gases will generally comprise oxygen usually supped as air as oxidant and hydrogen or a hydrogen containing compound, e.g. methane, as fuel. The interconnect or bipolar plate needs to be gas impervious to keep the reactant gases separate as well as electrically conducting to permit transport of electrons to and from the electrode surfaces to facilitate the electrochemical processes. As a result, the designs of such cells in the prior art have involved for the interconnect the fabrication and use of materials such as lanthanum chromite which are very expensive. These interconnects have been manufactured in an expensive sandwich structure form to provide the necessary gas permeability barrier between suitably channeled gas transporting layers.

It is a purpose of the present invention to reduce the fabrication cost of such cells and stacks incorporating them.

SUMMARY OF THE INVENTION

According to the present invention a solid fuel cell for high temperature operation includes a refractory solid electrolyte, an anode and a cathode both in intimate contact with the electrolyte and an electronically conducting interconnect medium having pores or channels therethrough permitting oxidant and fuel to be delivered without mixing repsectively to the cathode and the anode, wherein the anode, cathode and interconnect medium are provided as zones within a common unitary material, the anode and cathode being present as zones adjacent to different surfaces of the material and the interconnect medium being present as a zone intermediate to the cathode and anode zones.

According to the present invention in another aspect there is provided a stack of fuel cells each according to the aspect of the invention described above, the stack comprising alternate layers of solid electrolyte and layers of the said unitary material.

The said unitary material may comprise urania, preferably depleted urania, optionally doped with an oxidic material. The oxidic material may comprise one or more rare earth oxides in a doping concentration of up to 50 percent by weight of the doped urania. The oxidic material may comprise one or more of an oxide of yttrium, gadolinium or cerium or other oxide.

The doping concentration of the said material may vary through the said unitary material and/or from cell to cell in a stack of cells to facilitate the provision of a suitable electrochemical potential gradient from the anode of one cell to the cathode of the next and to allow thermal expansion of adjacent layers to be matched. For example, the average doping concentration may vary from 5 to 10 percent by weight from one cell to the next.

The said unitary material will have pores or channels running therethrough to the cathode and anode zones to permit delivery of reactants to those zones. As in the prior art, the reactants may comprise hydrogen or a hydrogen containing gaseous compound, e.g. methane, as fuel and air or oxygen or oxidiser.

The channels or pores to the cathode zone may conveniently run parallel to one another in a first set and the channels or pores to the anode zone may conveniently run parallel to one another in a second set the two sets of channels or pores being in different planes overlying one another with respect to the axis of the cell, the two sets also running at an angle, desirably 90 degrees, to one another.

Alternatively, the channels or pores in each set may form a labyrinth structure to extend the path length travelled by reactant gas molecules through the said unitary material.

The channels or pores may be formed by an convenient manufacturing technique applicable to the formation of holes in ceramics, e.g. use of carbon rods to burn out the holes.

The reactant fuel and any chemical products formed may be delivered to and removed from the said channels or pores in operation by known methods, e.g. pumping. Excess fuel, e.g. hydrogen, may be recirculated or alternatively burnt off.

The electrolyte in the cell or cells according to the present invention may comprise any one of the high temperature refractory oxides employed in the prior art SOFCs, e.g. zirconia.

The various layers forming cells in a stack according to the present invention may be manufactured in a single unitary structure from a single green composite structure followed by heat treatment to form the desired refractory composite stack.

The present invention unexpectedly allows SOFCs and stacks of them to be produced which are superior to those of the prior art in that the number of discrete layers of material in each cell is reduced and the use of expensive materials may be avoided (urania being much cheaper than lanthanum chromite for example) thereby simplifying and reducing the cost of the stack.

The use of urania optionally doped to provide electrode zones and the interconnect region in a unitary material also has operational advantageous benefits. Such material beneficially can have a combination of the following properties (a) stability in an oxidising environment (e.g. in oxygen); (b) stability in a reducing environment (e.g. in hydrogen); (c) it can have a suitable electronic conductivity, which for this application desirably gives a resistivity less than $10^{-2}$ ohm-cm; (d) it provides a suitable gas barrier, e.g. to prevent permeation of gas between the two sets of channels described above; (e) it suitable catalyses the interfacial electrode reactions; (f) it has suitable oxygen ion transport properties and (g) it has thermal expansion coefficients which can be selected so that the adjacent refractory layers in a cell can have matched and/or graded expansion properties to avoid undue mechanical stresses being developed. Because a stack of cells can be manufactured as a monolithic block the attachment of manifolding to the stack is facilitated to permit direction of air and fuel to the correct channels at various places along the block.

BRIEF DESCRIPTION OF THE FIGURE

An embodiment of the present invention will now be described by way of example with reference to the accompanying drawing, in which:

FIG. 1 is a transverse cross-sectional view through a laminar stack of SOFCs forming an electrochemical energy source.

DETAILED DISCUSSION OF PREFERRED EMBODIMENTS

As shown in FIG. 1 electrolyte layers 1 are sandwiched alternately between unitary interconnect/electrode layers 3 in a multilayer stack. Each of the layers 3 has a row of parallel channels 5 running therethrough in a place perpendicular to the axis of the stack, shown as axis X—X in FIG. 1, the channels 5 running parallel to an axis perpendicular to the plane of the drawing. Each of the layers 3 also has a row of parallel channels 7 running therethrough in another plane perpendicular to the axis of the stack, X—X, but in this case the channels 7 run parallel to an axis in the plane of the drawing. The channels 5 permit gaseous fuel, e.g. hydrogen, to be delivered in each cell to a region providing a fuel electrode zone 3a adjacent to one face 1b of the next electrolyte layer 1. The channels 7 permit gaseous oxidant, e.g. air, to be delivered in each cell to a region providing an oxidiser electrode zone 3b on the other side of each layer 3 and adjacent to the other stack 1a of the electrolyte layer 1.

The electrolyte layer 1 may comprise zirconia and the layers 3 may comprise urania doped with a rare earth oxide. The doping concentration of the rare earth oxide may be graded along the stack as described above.

In operation, a suitable operating temperature is maintained by the exothermic electrode processes, using a method of cooling if necessary. During start-up, heat will be supplied from an external source.

In each fuel electrode zone 3a positive hydrogen ions are formed as follows:

$$H_2 \rightarrow 2H^+ + 2e^-  \qquad \text{Process 1}$$

In each oxidising electrode zone 3b negative oxygen ions are formed as follows:

$$O + 4e^- \rightarrow 2O^{2-} \qquad \text{Process 2}$$

The electrons e for this Process 2 at the zone 3b are liberated by the above Process 1 at the fuel electrode zone 3a and are obtained by electronic conduction through the layer 3 from the zone 3a to the zone 3b.

At the electrolyte, anode boundary layer 1b, the oxygen and hydrogen ions combine to form water as follows:

$$2H^+ + O^{2-} \rightarrow H_2O \qquad \text{Process 3}$$

The result of these processes is to produce a current and voltage, through and across each cell respectively, the voltages being additive. The overall voltage form the stack is the voltage provided from each cell multiplied by the number of cells in the stack. The overall power generated may be extracted by connection of a suitable external circuit to conducting pads (not shown) attached in a known way to layers 3 the respective ends of the stack.

We claim:

1. A solid oxide fuel cell for high temperature operation, said fuel cell comprising:

a refractory solid electrolyte, an anode and a cathode both in intimate contact with the electrolyte; and an electronically conducting interconnect medium having pores or channels therethrough permitting oxidant and fuel to be delivered without mixing respectively to the cathode and the anode, wherein the anode, cathode and interconnect medium provided as zones and are comprised of a single common unitary material whose composition varies through the material to provide zones and interconnect medium, the anode and cathode being present as zones adjacent to different surfaces of the material and the interconnect medium being present as a zone intermediate to the cathode and anode zones.

2. A solid oxide fuel cell as in claim 1 and wherein said unitary material comprises urania or oxide doped urania.

3. A solid oxide fuel cell as in claim 2 and wherein said unitary material comprises one or more rare earth oxides in a doping concentration of up to 50 percent by weight of the doped urania.

4. A solid oxide fuel cell as in claim 4 and wherein said unitary material comprises at least one of an oxide of yttrium, gadolinium and cerium.

5. A fuel cell as in claim 2 and wherein the doping concentration of said oxidic material varies through the said unitary material.

6. A fuel cell as in claim 1 and where said unitary material has pores or channels running therethrough to the cathode and anode zones to permit delivery of reactants to those zones.

7. A fuel cell as in claim 6 and wherein the channels to the cathode zone run parallel to one another in a first set and the channels or pores to the anode zone run parallel to one another in a second set, the two sets of channels or pores being in different planes overlying one another with respect to the axis of the cell, the two sets also running at an angle, of 90 degrees to one another.

8. A fuel cell according to claim 6 and wherein the channels or pores in the set running to the cathode zone and the channels or pores in the set running to the anode zone each form a labyrinth structure.

9. A stack of fuel cells each according to claim 1, the stack comprising alternate layers of solid electrolyte and layers of said unitary material.

10. A stack as in claim 9 which is a single monolithic structure.

11. A stack as in claim 9 and wherein said unitary material in the various cells in the stack comprises urania doped with an oxidic material, the doping concentration of the oxidic material varying from one cell to the next.

* * * * *